United States Patent [19]

Christenson et al.

[11] 4,260,716
[45] Apr. 7, 1981

[54] POLYMERIC QUATERNARY AMMONIUM HYDROXIDES AND THEIR USE IN COATING APPLICATIONS

[75] Inventors: Roger M. Christenson, Gibsonia; Joseph F. Bosso, Lower Burrell; Marvis E. Hartman, Pittsburgh; Wen-Hsuan Chang, Gibsonia, all of Pa.

[73] Assignee: PPG Industries, Inc., Pittsburgh, Pa.

[21] Appl. No.: 36,717

[22] Filed: May 7, 1979

Related U.S. Application Data

[63] Continuation of Ser. No. 873,634, Jan. 30, 1978, abandoned, which is a continuation-in-part of Ser. No. 744,532, Nov. 24, 1976, Pat. No. 4,081,341.

[51] Int. Cl.$^3$ .............................................. C08G 18/58
[52] U.S. Cl. ................................ 528/45; 204/181 C; 260/29.2 TN; 260/29.2 EP; 525/528; 528/71; 528/73
[58] Field of Search ............... 260/29.2 EP, 29.2 TN, 260/830 P, 835; 528/45, 71, 73; 204/181 C; 525/528

[56] References Cited

U.S. PATENT DOCUMENTS

| | | | |
|---|---|---|---|
| 2,676,166 | 4/1954 | Webers | 260/85.7 |
| 3,922,253 | 11/1975 | Jerabek et al. | 260/77.5 TB |
| 3,935,087 | 1/1976 | Jerabek et al. | 204/181 |
| 3,962,165 | 6/1976 | Bosso et al. | 260/29.2 EP |
| 4,001,156 | 1/1977 | Bosso et al. | 260/29.2 EP |
| 4,009,133 | 2/1977 | Jones | 260/29.2 TN |
| 4,031,050 | 6/1977 | Jerabek | 260/29.2 TN |
| 4,069,210 | 1/1978 | Schimmel | 260/29.2 EP |
| 4,076,675 | 2/1978 | Sommerfeld | 260/29.4 UA |
| 4,076,676 | 2/1978 | Sommerfeld | 260/29.4 R |
| 4,081,341 | 3/1978 | Christenson et al. | 204/181 C |
| 4,101,486 | 7/1978 | Bosso et al. | 260/29.2 TN |
| 4,110,287 | 8/1978 | Bosso et al. | 260/29.2 EP |
| 4,148,772 | 4/1979 | Marchetti et al. | 260/29.2 EP |

FOREIGN PATENT DOCUMENTS

884929 11/1971 Canada.

*Primary Examiner*—Earl A. Nielsen
*Attorney, Agent, or Firm*—William J. Uhl

[57] ABSTRACT

Quaternary ammonium hydroxide-containing polymers and their use in coating applications are disclosed. The quaternary ammonium hydroxide-containing polymers are prepared from reacting a polyglycidyl ether of a cyclic polyol with a tertiary amine in the presence of a sufficient amount of water for the formation of quaternary hydroxide groups.

The quaternary ammonium hydroxide-containing polymers are particularly good as electrocoating resins in that they electrodeposit without generating acid counterion. They are also good in other conventional coating applications such as dip, flow, spray and roll coating in that the resulting coating can be baked without the generation of corrosive acid.

9 Claims, No Drawings

POLYMERIC QUATERNARY AMMONIUM HYDROXIDES AND THEIR USE IN COATING APPLICATIONS

CROSS-REFERENCE TO RELATED APPLICATIONS

This application is a continuation of application Ser. No. 873,634, filed Jan. 30, 1978, now abandoned, which is a continuation-in-part of copending application Ser. No. 744,532, filed Nov. 24, 1976, now U.S. Pat. No. 4,081,341.

BACKGROUND OF THE INVENTION

1. Field of the Invention:

The present invention relates to quaternary ammonium hydroxide-containing polymers and to their method of preparation.

2. Brief Description of the Prior Art:

Cationic electrodeposition as practiced on an industrial scale involves immersing an electroconductive article in an aqueous dispersion of a polymeric material which contains cationic groups such as quaternary ammonium salt groups or amine salt groups. An electric current is passed through the dispersion between the electroconductive article as cathode and a counter electrode as anode to cause a deposition of the coating on the cathode. During the electrodeposition, acid is generated at the counter electrode and continuously builds up in the bath where it can corrode equipment and raise the conductivity of the bath making it more difficult to electrodeposit smooth uniform coatings.

The prior art has recommended numerous ways to control this acid build-up such as by subjecting the bath to ultrafiltration and electrodialysis. However, these methods have shortcomings associated with them in that they require additional equipment costs as well as the expense of monitoring and maintaining the additional equipment.

SUMMARY OF THE INVENTION

The present invention overcomes many of the disadvantages of the prior art. The present invention provides a water-dispersible, curable, resinous coating composition in which the resinous component comprises an active hydrogen-containing quaternary ammonium hydroxide-containing polymer in combination with a blocked isocyanate curing agent. The quaternary ammonium hydroxide-containing polymer comprises the reaction product of:

(A) a polyglycidyl ether of a cyclic polyol;
(B) a tertiary amine.

Sufficient water is present during the reaction of (A) and (B) for the formation of quaternary ammonium hydroxide groups without substantial advancement in molecular weight of the polymer. The quaternary ammonium hydroxide-containing polymer has a molecular weight of 1000 to 5000 and contains 0.05 to 6.0 milliequivalents of quaternary nitrogen base group per gram of polymer.

The quaternary ammonium hydroxide-containing polymers can be used as electrocoating vehicles. When the polymers are dispersed in water and an electric current passed between an electroconductive cathode and an anode, in electrical contact with a polymeric dispersion, the polymer deposits on the cathode without generating harmful counterion at the anode.

The quaternary ammonium hydroxide-containing polymers can also be used in flow coating applications such as dip and roll coating in which the resulting coating can be baked without generation of corrosive acid.

PERTINENT PRIOR ART

U.S. Pat. No. 3,839,252 to Bosso and Wismer discloses quaternary ammonium salt group-containing resins, useful for electrodeposition, which are prepared by reacting organic polyglycidyl ethers of cyclic polyols with amine acid salts in the presence of water. The reference does not disclose polymeric quaternary ammonium hydroxides.

German Offenlegungsschrift No. 2,611,673 to PPG Industries, Inc. discloses quaternary ammonium salt group-containing resins, useful for electrodeposition. The resins are prepared by advancing the molecular weight polyepoxides such as polyglycidyl ethers of polyphenols with N-heterocyclic ring containing materials having one or more

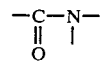

moieties in the ring. The advanced products which contain residual epoxy groups are then reacted with amine-acid salts in the presence of water to form the quaternary ammonium salt group. The reference does not disclose polymeric quaternary ammonium hydroxides.

U.S. Pat. No. 2,676,166 to Webers discloses quaternary ammonium base group including quaternary ammonium hydroxide-containing polymers prepared by reacting expoxy-containing acrylic polymers with tertiary amines in the presence of acid and/or water. The reference states the polymers are useful in coating applications, although the reference does not disclose that the quaternary ammonium hydroxides would be useful in electrodeposition. Also, the reference indicates that the resins are useful because they have a combination of high molecular weight and high epoxy content, a combination not possible with polyglycidyl ethers of polyphenols.

Canadian Patent No. 884,929 discloses the reaction product of polyepoxides with tertiary amines. Although quaternary ammonium hydroxides are not specifically disclosed, under the reaction conditions disclosed in some portions of the patent, particularly the working examples, quaternary ammonium hydroxides would be inherently formed. For example, a polyepoxide is reacted with a tertiary amine neat. The reaction is permitted to proceed for a time and is then quenched with water. Under such conditions, a quaternary ammonium hydroxide would be inherently formed. However, the procedure of the Canadian patent is undesirable because it results in an uncontrolled molecular weight build-up of the polyepoxide. Thus, in the Canadian patent, relatively low molecular weight polyepoxides (e.g., molecular weight of about 600) are used as starting materials, the reaction with the tertiary amine permitted to proceed to a higher molecular weight product and the reaction stopped by quenching with water. One of the disadvantages of this technique is lack of control over molecular weight of the final product. In fact, if the reaction is not stopped quickly enough, a gelled product may result. The present invention overcomes these shortcomings by conducting the epoxy-tertiary amine reaction in a controlled manner. The reaction is conducted in the presence of water such that there is no substantial buildup in molecular weight of the polyepoxide starting material. Thus, polyepoxides of a desired and predetermined high molecular weight can be used as starting materials and quaternary ammonium hydroxides formed with little danger of gelling.

DETAILED DESCRIPTION

The quaternary ammonium hydroxide-containing polymers are non-gelled and are made by reacting an epoxy-containing polymeric material with an amine, preferably a tertiary amine, in the presence of water.

The epoxy-containing polymer is a resinous polyepoxide, that is, a polymeric resinous material having a 1,2-epoxy equivalency greater than one. The polyepoxides are selected from polyglycidyl ethers of cyclic polyols.

The preferred polyepoxides are polyglycidyl ethers of polyphenols such as Bisphenol A. These can be produced, for example, by etherification of a polyphenol with epihalohydrin or dihalohydrin such as epichlorohydrin or dichlorohydrin in the presence of alkali. The polyphenol can be, for example, 2,2-bis-(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane, 1,5-dihydroxy-3-naphthalene or the like.

While the polyglycidyl ethers of the polyphenols may be employed per se, it is frequently desirable to react a portion of the reactive sites (i.e., hydroxyl) with a modifying material to vary the film characteristics of the polymer. The esterification of the epoxy-containing polymers with carboxylic acids, especially fatty acids, is well known in the art and need not be discussed in detail. Especially preferred are saturated fatty acids, and especially pelargonic acid.

Another quite useful class of polyepoxides is produced from novolak resins or similar polyphenol resins.

Besides polyphenols, other cyclic polyols can be used in preparing the polyglycidyl ether derivatives. Examples of other cyclic polyols would be alicyclic polyols, particularly cycloaliphatic polyols, such as 1,2-cyclohexanediol, 1,4-cyclohexanediol, 1,2-bis(hydroxymethyl) cyclohexane, 1,3-bis(hydroxymethyl)cyclohexane. Also, oxyalkylated adducts such as ethylene and propylene oxide adducts of these alicyclic polyols can be used. Also, ethylene and propylene oxide adducts of the polyphenol can be used as the cyclic polyol.

The polyglycidyl ethers of cyclic polyols, particularly the polyphenols, can be further reacted to chain extend and increase their molecular weight. For example, they may be further reacted with active hydrogen-containing materials which are, of course, different from the polyglycidyl ethers of the cyclic polyols and which are reactive with epoxy groups, such as those containing hydroxyl, thiol, carboxylic acid, primary and secondary amino groups. Preferred chain extenders are organic polyols, preferably polymeric polyols, such as polyester polyols including polylactone polyols. Chain extending of epoxy-containing polymeric materials with polymeric polyols is disclosed in German Offenlegungsschrift No. 2,701,002 to PPG Industries, Inc.

The polyglycidyl ethers of polyphenols can also be chain extended with N-heterocyclic ring-containing materials having one or more

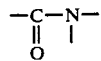

moieties in the ring. For example, the N-heterocyclic ring-containing material could have the following structural formula:

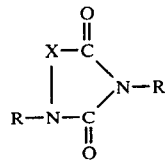

where X is a bivalent radical which is necessary to complete a 5 or 6-membered unsubstituted or substituted heterocyclic ring; where R is H or

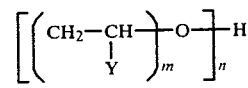

where Y is hydrogen or lower alkyl having 1 to 4 carbon atoms, m is 1 to 4 and n is 1 to 50. Chain extension of polyglycidyl ethers of cyclic polyols (polyphenols) is described in German Offenlegungsschrift No. 2,611,673 to PPG Industries, Inc.

The amine which is reacted with the epoxy-containing polymers as described above may be selected from a wide variety of tertiary amines. Tertiary amines which may be used may be unsubstituted or substituted with substituents such as hydroxyl as long as the substituent does not interfere with the reaction of the amine with the epoxy-containing polymer, and the substituents are of such a nature or employed under conditions that they will not gel the reaction mixture. Examples of suitable tertiary amines include dimethylethanolamine, triethylamine, trimethylamine, triisopropylamine and the like. Examples of other tertiary amines are disclosed in U.S. Pat. No. 3,839,252 to Bosso and Wismer in column 5, line 3, through column 7, line 42, the portions of which are hereby incorporated by reference.

The amine and the epoxy-containing polymer are reacted in the presence of water. If the quaternization reaction is carried out in the presence of water, quaternary ammonium hydroxides are produced. The amount of water is sufficient for the formation of quaternary ammonium hydroxide groups without substantial advancement in molecular weight of the polymer. Preferably, based on amine groups, a stoichiometric equivalent or excess of water, that is, at least one mole of water is used per one mole of amine. Excess water can be used to control the exothermic amine-epoxy reaction. Typically, the mole ratio of water to amine nitrogen is controlled between about 1.0 to about 16 moles of water per equivalent of amine nitrogen. Greater amounts of water are not recommended because they result in extremely slow or even non-reaction.

The reaction temperature may be varied between the lowest temperature at which reaction reasonably proceeds, for example, room temperature, or in the usual case, slightly above room temperature to a maximum temperature of about 100° C. (at atmospheric pressure). At greater than atmospheric pressure, higher reaction temperatures can be used. Usually, reaction temperatures range between about 60° to 100° C.

In the formation of the quaternary ammonium hydroxides, it is preferred that a stoichiometric excess of amine to epoxy, i.e., a molar excess, be present during the reaction to avoid gelation. Thus, it is desirable to add the epoxy-containing polymer slowly to a mixture of amine and water in order to maintain an excess of amine. It is also desirable to carry out the reaction between the amine and epoxy at a fast rate. Slow reaction rates can lead to gelation.

With regard to the amount of tertiary amine and epoxy-containing polymer which are reacted with one another, the relative amounts can be varied and depend on the extent of quaternization desired, and this in turn will depend on the molecular weight and structure of the epoxy-containing polymer. The extent of quaternization, the molecular weight and structure of the epoxy-containing polymer should be selected such that when the quaternary ammonium hydroxide-containing polymer is mixed with an aqueous medium to form an electrodeposition bath, a stable dispersion will form. A stable dispersion is one which does not sediment or is one which is easily redispersed if some sedimentation occurs. In addition, the dispersion should be of sufficient cationic character that the dispersed resin particles will migrate towards the cathode when an electrical potential is impressed between an anode and a cathode immersed in the aqueous dispersion. Also, the molecular weight, structure and extent of quaternary ammonium hydroxide formation should be controlled so that the dispersed resin will have the required flow to form a film on a cathode. The film must be insensitive to moisture to the extent that it will not redissolve in the electrodeposition bath or be rinsed away from the coated cathode after its removal from the bath.

In general, however, most of the quaternary ammonium hydroxide-containing polymers useful in the practice of the present invention have molecular weights within the range of 500 to 60,000 and contain from about 0.01 to 10 milliequivalents of quaternary nitrogen base group per gram of resin solids. Obviously, one must use the skill of the art to couple the molecular weight with the quaternary nitrogen base group content to arrive at a satisfactory polymer. With regard to the quaternary ammonium hydroxide-containing polymers prepared from the preferred polyglycidyl ethers of polyphenols, the molecular weight of the preferred polymers fall within the range of 500 to 10,000 more preferably 1000 to 5000. These preferred polymers will contain from 0.01 to 8.0, preferably 0.05 to 6.0 milliequivalents of quaternary nitrogen base group per gram of polymer.

When it is desired that the quaternary ammonium hydroxide-containing resins contain free epoxy groups, the ratio of starting organic epoxy-containing polymer to tertiary amine is selected so as to provide an excess of epoxy groups, thereby producing a resin containing free unreacted epoxy groups. Epoxy-free resins can be prepared by reacting the stoichiometric amounts of tertiary amine with the available epoxy groups. Epoxy-free resins can also be provided by preparing epoxy-containing reaction products and post-reacting the epoxy groups with active hydrogen-containing materials such as fatty acid, phenols and mercaptans.

Besides the tertiary amines described above, useful resins of the invention can be prepared with primary and secondary amines. This may be accomplished by first reacting the primary or secondary amine with an epoxy-containing polymer and heating the reaction mixture to a suitable reaction temperature. The amine and the epoxy groups which may be from the resinous polyepoxide or from externally added epoxy such as propylene oxide, are reacted until a tertiary amine is formed. Further reaction causes tertiary amine to react with any residual remaining epoxy groups present to form the quaternary ammonium base group. When using primary or secondary amines, some precautions should be taken to avoid gelling of the resin. For example, when quaternization is effected through the polymeric epoxy moiety, the molecular weight should be low and/or the epoxy equivalent weight high to avoid gelling. If higher molecular weight and/or lower epoxy equivalent weights are needed, for example, for good electrocoating properties, the quaternization should be effected with externally added epoxy.

The quaternary ammonium hydroxide-containing polymers can be used as the cationic electrocoating vehicle themselves, or, preferably, they can be used in combination with acid-solubilized cationic electrocoating resins.

Use of the quaternary ammonium hydroxide-containing polymers as the sole electrocoating vehicles is desirable because the polymers electrodeposit on the cathode without generating acid from the counterion which will build up in the bath.

Examples of acidified cationic electrodeposition resins are amine acid salt-containing polymers and quaternary ammonium salt group-containing polymers which are acidified with a relatively strong acid, that is, an acid having a dissociation constant greater than $1 \times 10^{-5}$.

Examples of amine acid salt-containing polymers are those prepared by reacting an organic epoxy-containing polymer such as described above with a secondary amine in the presence of an organic solvent to form the tertiary amine. The amine-containing adducts can then be acidified to form the salt. Such resins are described in U.S. Pat. No. 3,984,299 to Jerabek; U.S. Pat. No. 3,947,338 to Jerabek and Marchetti and U.S. Pat. No. 3,947,339 to Jerabek, Marchetti and Zwack.

Examples of quaternary ammonium salt group-containing polymers are those prepared by reacting an epoxy-containing polymer such as those described above with a tertiary amine acid salt in the presence of water. These polymers are described in U.S. Pat. No. 3,839,252 to Bosso and Wismer.

The quaternary ammonium hydroxide-containing polymers of the present invention can also be used in flow coating applications such as spray coating, dip coating and roll coating. The use of the quaternary ammonium hydroxide-containing polymer in these applications is desirable because when the resultant coating is baked, there will be no corrosive acid generated.

The quaternary ammonium hydroxide polymers of the present invention are employed in the form of an aqueous dispersion. The term "dispersion" as used within the context of the present invention is believed to be a two-phase, transparent, translucent or opaque aqueous resinous system in which the resin is in the dispersed phase and the water in the continuous phase. The average particle size diameter of the resinous phase is generally less than 10, preferably less than 5 microns.

The concentration of the resinous products in the aqueous medium depends upon the process parameters to be used and is, in general, not critical, but ordinarily, the major portion of the aqueous dispersion is water. For example, aqueous dispersions preferably contain from 1 to 50 percent by weight resin solids.

Besides water, the aqueous medium may contain a coalescing solvent. The use of a coalescing solvent may be, in some instances, for improved deposited film appearance. These solvents include hydrocarbons, alcohols, esters, ethers and ketones. The preferred coalescing solvents include monoalcohols, glycols and polyols as well as ketones and other alcohols. Specific coalescing solvents include isopropanol, butanol, isophorone, 4-methoxymethyl-2-pentanone, ethylene and propylene glycol, the monoethyl, monobutyl and monohexyl ethers of ethylene glycol and 2-ethylhexanol. The amount of coalescing solvent is not unduly critical and is generally between about 0.01 and 40 percent by weight, preferably, about 0.5 to about 25 percent by weight based on total weight of aqueous medium.

In most instances, a pigment composition and, if desired, various additives such as surfactants or wetting agents are included in the dispersion. The pigment compositions may be any of the conventional type comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as the pigment-to-resin ratio. In the practice of the present invention, pigment-to-resin ratios within the range of 0.01 to 5:1 are usually used. The other additives mentioned above are present in the dispersion in amounts of 0.01 to 3 percent by weight based on total weight of resin solids.

The aqueous dispersion can also contain the curing agent. The quaternary ammonium hydroxide polymers can be prepared to contain active hydrogens such as hydroxyl, thiol, primary and secondary amine groups. In these instances, the curing agents should be those which are reactive with the active hydrogens. Examples include blocked isocyanates, phenolic resins and amine-aldehyde resins. Examples of some of these curing agents in cationic electrodeposition are found in U.S. Pat. No. 3,984,299 to Jerabek; U.S. Pat. No. 3,947,338 to Jerabek and Marchetti and U.S. Pat. No. 3,937,679 to Bosso and Wismer.

In the electrodeposition process employing the aqueous dispersions described above, the aqueous dispersion is placed in contact with an electrically conductive anode and an electrically conductive cathode with the surface to be coated being the cathode. While in contact with the aqueous dispersion, an adherent film of the coating composition is deposited on the cathode when a voltage is impressed between the electrodes.

The conditions under which electrodeposition is carried out are, in general, similar to those used in electrodeposition of other types of coatings. The applied voltage may be varied and can be, for example, as low as one volt or as high as several thousand volts, but typically, between 50 and 500 volts. The current density is usually between 1.0 ampere and 15 amperes per square foot and tends to decrease during electro-deposition indicating the formation of a self-insulating film.

The quaternary ammonium hydroxide-containing polymers of the present invention can also be used in other conventional coating applications such as dip, flow, spray and roll coating. The use of quaternary ammonium hydroxide-containing polymers in these applications is desirable because when the resultant coating is baked, no corrosive acid is generated in the baking oven.

For electrodeposition and other conventional coating applications, the coating compositions can be applied to a variety of electroconductive substrates especially metal such as steel, aluminum, copper, magnesium and the like, but also including metallized plastic and conductive carbon-coated materials. For other conventional coating applications, the coating compositions can be applied to non-metallic substrates such as glass, wood and plastic.

After the coating has been applied by electrocoating or flow coating, it is usually baked at elevated temperatures such as 90° to 260° C. for about 1 to 30 minutes.

Illustrating the invention are the following examples, which, however, are not to be construed as limiting the invention to their details. All parts oand percentages in the examples, as well as throughout this specification, are by weight unless otherwise indicated.

EXAMPLE I

The following example shows the preparation of a quaternary ammonium hydroxide-containing polymer from reacting a polyglycidyl ether of a polyphenol with a tertiary amine in the presence of water. The quaternary ammonium hydroxide-containing polymer was then used as a feed resin to control the pH of an electrodeposition bath which contained an acidified cationic resinous coating vehicle.

The acidified cationic resinous coating vehicle was an amine acid salt group-containing resin which was prepared by charging into a suitable reactor 970 parts by weight of EPON 1001 (polyglycidyl ether of bisphenol having an epoxy equivalent weight of 508 and commercially available from Shell Chemical Company) and 265 parts by weight of a polycaprolactonediol sold commercially by Union Carbide Corporation under the trade name PCP 0200. This particular product was believed to be made by the ring opening of epsilon-caprolactone with ethylene glycol to produce a polymer having a molecular weight of approximately 543. This charge was heated to 100° C. under a nitrogen blanket and 0.46 parts of benzyldimethylamine added. The reaction mixture was heated further to 130° C. where it was held for about 1½ hours. The batch was then cooled to 110° C. and 110 parts by weight of methyl isobutyl ketone was introduced into the reaction vessel followed by 39.8 parts by weight of a 73 percent non-volatile solution of the ketoxime formed from reacting methyl isobutyl ketone and diethylene triamine in methyl isobutyl ketone solvent followed by an additional 100 parts by weight of methyl isobutyl ketone. Cooling was continued until the batch reached 70° C. at which point 53.1 parts by weight of diethylamine were introduced and the batch reheated to 120° C. where it was held for 3 hours and then discharged.

Five hundred seventy-six (576) parts of the above-described polycaprolactonediol chain extended polyepoxide was blended with 310 parts by weight of a polyurethane crosslinker and 13.2 parts of dibutyltin dilaurate catalyst followed by neutralization with 12.3 parts of glacial acetic acid and reduced with sufficient deionized water to form a 40 percent resin solids dispersion.

The polyurethane crosslinker was prepared by adding 218 parts by weight of 2-ethylhexanol slowly to 291 parts by weight of an 80/20 isomer mixture of 2,42,6-toluene diisocyanate under agitation and a dry nitrogen blanket, keeping the reaction temperature under 100° F.

(38° C.) by external cooling. The charge was held an additional ½ hour at 100° F. (38° C.) and then heated to 140° F. (60° C.) at which point 75 parts by weight of trimethylolpropane were added followed by 0.08 parts of dibutyltin dilaurate catalyst. After an initial exotherm, the batch was held at 250° F. (121° C.) for 1½ hours until essentially all of the isocyanate moiety was consumed as indicated by an infrared scan. The batch was then thinned with 249 parts of ethylene glycol monoethyl ether.

A pigment grinding vehicle was prepared from the following charge:

| Ingredient | Parts by Weight | Solids |
|---|---|---|
| EPON 829 | 710.0 | 681.2 |
| Bisphenol A | 289.6 | 289.6 |
| 2-ethylhexanol half-capped toluene diisocyanate in methyl isobutyl ketone | 406.4 | 386.1 |
| quaternizing agent[a] | 496.3 | 421.9 |
| deionized water | 71.2 | — |
| butyl CELLOSOLVE | 56.76 | — |

[a]Quaternizing agent was an organic tertiary amine acid salt prepared from the following charge:

| Ingredient | Parts by Weight | Solids |
|---|---|---|
| 2-ethylhexanol half-capped toluene diisocyanate in methyl ethyl ketone | 320.0 | 304 |
| dimethylethanolamine | 87.2 | 87.2 |
| aqueous lactic acid solution | 117.6 | 88.2 |
| butyl CELLOSOLVE | 39.2 | — |

The 2-ethylhexanol half-capped toluene diisocyanate was added to the dimethylethanolamine in a suitable reaction vessel at room temperature. The mixture exothermed and was stirred for one hour at 80° C. Lactic acid was then charged followed by the addition of butyl CELLOSOLVE. The reaction mixture was stirred for about one hour at 65° C. to form the desired quaternizing agent.

To prepare the pigment grinding vehicle, the EPON 829 and Bisphenol A were charged under a nitrogen atmosphere to a suitable reaction vessel and heated at 150–160° C. to initiate an exotherm. The reaction mixture was permitted to exotherm for one hour followed by cooling to 120° C. and the addition of the 2-ethylhexanol half-capped toluene diisocyanate added. The temperature of the reaction mixture was held at 110°–120° C. for one hour, followed by the addition of the butyl CELLOSOLVE. The reaction mixture was then cooled to 85°–90° C., homogenized and charged with water, followed by the addition of the quaternizing agent. The temperature of the reaction mixture was held at 85° C. until an acid value of one was obtained.

A pigment paste was prepared as follows:

| Ingredient | Parts by Weight |
|---|---|
| pigment grinding vehicle prepared as described above | 240.55 |
| deionized water | 478.75 |
| ASP-17 clay | 240.55 |
| lead silicate | 42.24 |
| carbon black | 33.68 |

The ingredients were mixed in a Cowles mixer for about 10 minutes and the mixture combined with 22.12 parts by weight of strontium chromate and ground in a Zircoa mill to a Hegman No. 7 grind.

A catalyst, dibutyltin oxide, in the form of a pigment paste was prepared from the following charge:

| Ingredient | Parts by Weight |
|---|---|
| pigment grinding vehicle prepared as described above | 201.54 |
| deionized water | 460.35 |
| dibutyltin oxide | 283.67 |

The above charge was ground in a Zircoa mill to a Hegman No. 7 grind.

An electrodeposition bath was prepared by mixing the following ingredients in 1835 parts by weight of deionized water:

| Ingredient | Parts by Weight |
|---|---|
| acetic acid | 2.5 |
| amine acid salt-containing resin prepared as described above | 1590 |
| pigment paste | 357 |
| catalyst paste | 15.5 |

One hundred (100) parts by weight of a 10 percent by weight acetic acid aqueous solution was added to the electrodeposition bath prepared as described above to simulate build-up of acid which occurs in an electrodeposition bath after it has been in use for a period of time. The pH of the electrodeposition bath dropped from 6.25 to 5.3. Two hundred sixteen (216) parts by weight of the quaternary ammonium hydroxide-containing resin prepared as described below was added to the bath and raised the pH to 6.0 evidencing neutralization of the acid and formation of the quaternary ammonium salt. Zinc phosphated steel panels were cathodically electrodeposited with this electrodeposition bath at 270 volts for 2 minutes at a bath temperature of 80° F. (27° C.) to give a textured 0.5 mil film. Both the tertiary amine acid salt-containing resin and the quaternary ammonium base group resin electrodeposited. The electrodeposition bath evidenced a 2 minute Ford throwpower of 9⅛ inches at 270 volts at a bath temperature of 82° F. (28° C.).

The quaternary ammonium hydroxide-containing polymer was prepared from the following charge:

| Ingredient | Parts by Weight |
|---|---|
| EPON 829[1] | 219.7 |
| Bisphenol A | 89.4 |
| toluene diisocyanate half-capped with 2-ethylhexanol | 125.7 |
| butyl CELLOSOLVE[2] | 194.9 |
| butyl CELLOSOLVE | 194.9 |
| deionized water | 60 |
| adduct of 2-ethylhexanol half-capped toluene diisocyanate and dimethylethanolamine | 158.3 |

[1]EPON 829 is an epoxy resin solution made from reacting epichlorohydrin and Bisphenol A having an epoxy equivalent of 193–202 and commercially available from Shell Chemical Company.
[2]Ethylene glycol monobutyl ether.

The EPON 829 and Bisphenol A were charged to a reaction vessel and heated to exotherm for about one hour and 18 minutes, the highest temperature reaching 190° C. The reaction mixture was cooled to 120° C. and the adduct of one mole of 2-ethylhexanol and one mole of toluene diisocyanate was added. The reaction mixture was held at 120° C. for one hour followed by the addition of the first portion of butyl CELLOSOLVE and then cooling to 85° C. The second portion of butyl CELLOSOLVE, deionized water and the adduct of one mole of dimethylethanolamine, one mole of toluene diisocyanate and one mole of 2-ethylhexanol was added and the reaction mixture held at 75° C. for one hour followed by cooling to room temperature. The reaction mixture had a solids content of 56.64 percent, a Gardner-Holdt viscosity of Z₃⁻ and contained 0.58 milliequivalents of total base per gram of resin solids and 0.453 milliequivalents of quaternary ammonium base groups per gram of resin solids indicating 78.2 percent of the total base groups were quaternary ammonium hydroxide groups.

EXAMPLE II

The following example shows the preparation of a quaternary ammonium hydroxide-containing polymer from reacting a polyglycidyl ether of a polyphenol with a tertiary amine in the presence of water. The quaternary ammonium hydroxide-containing polymer was then used as an electrocoating vehicle and as feed resin to control the pH of an electrodeposition bath which contained an acidified cationic resinous coating vehicle.

The polyglycidyl ether of a polyphenol was prepared from the following charge:

| Ingredient | Parts by Weight Solids | Grams |
|---|---|---|
| EPON 829 | 600.0 | 625.0 |
| Bisphenol A | 202.0 | 202.0 |
| PLURONIC L-31[1] | 368.0 | 368.0 |
| TEXANOL[2] | — | 62.0 |
| dimethylethanolamine | 2.5 | 2.5 |
| 88% by weight aqueous lactic acid solution | 2.6 | 3.0 |
| methyl ethyl ketone | — | 304.3 |

[1]Polypropylene glycol terminated with ethylene glycol moieties having a molecular weight of about 1200, commerically available from BASF Wyandotte Company.
[2]2,2,4-trimethylpentane-1,3-diol monoisobutyrate.

The EPON 829 and the Bisphenol A were charged to a reaction vessel and heated over the period of about 35 minutes to exotherm at 150° C. The exotherm was maintained for about 25 minutes with the highest temperature being about 210° C. The reaction mixture was then cooled to room temperature and the PLURONIC L-31 and TEXANOL were added. The reaction mixture was then heated to 125° C. followed by the addition of the dimethylethanolamine (catalyst for chain extension of polyepoxide with PLURONIC L-31). The temperature was maintained at 125°-133° C. for about 2 hours and 35 minutes at which point in time the reaction mixture had a P Gardner-Holdt viscosity measured at 25° C. at 46.6 percent solids in ethyl CELLOSOLVE. The lactic acid was then added to neutralize the dimethylethanolamine catalyst followed by thinning of the reaction mixture with methyl ethyl ketone. The reaction mixture was then cooled to room temperature.

Fifteen hundred sixty-seven (1567) parts by weight of the epoxy resin reaction mixture prepared as described immediately above (1175 parts by weight solids) was added steadily to a 50 percent by weight aqueous solution of dimethylethanolamine to form the quaternary ammonium hydroxide. The addition was over the period of about 2 hours and the temperature was maintained at about 82°-84° C. At the completion of the addition, the reaction mixture was thinned with 74 parts by weight of phenyl CELLOSOLVE (ethylene glycol monophenyl ether) followed by distilling to remove the methyl ethyl ketone. The resin was very viscous and was thinned with 500 milliliters of deionized water, warmed to 85° C. and thinned again with 827.7 parts by weight of deionized water to form about a 47 percent by weight solids dispersion. The quaternary ammonium hydroxide-containing polymer contained 0.342 milliequivalents of quaternary ammonium base groups per gram of resin based on resin solids.

The aqueous dispersion of the quaternary ammonium hydroxide-containing polymer prepared as described above was thinned with additional deionized water to form a 10 percent solids electrodeposition bath. The bath had a pH of 11.0 and appeared to be greenish-brown in color. Zinc phosphated steel panels were electrocoated in this bath at a bath temperature of about 80° F. (27° C.) at 100 volts for approximately 45 seconds. The maximum amperage was 0.5 amps which dropped to 0.04 amps during deposition. A thicker than desired, somewhat porous film was electrodeposited on the side of the panels facing the anode. Most of the panel facing away from the anode was only partially coated. The deposited film was not sensitive to a deionized water rinse.

When 463 parts by weight of the 40 percent by weight aqueous dispersion of the quaternary ammonium hydroxide-containing resin prepared as described above was added to 3500 parts by weight of the excess acid-containing electrodeposition bath described in Example I, the pH of the electrodeposition bath was raised from 5.4 to 6.0. Zinc phosphated steel panels were cathodically electrodeposited with this electrodeposition bath at 50 volts for 2 minutes at a bath temperature of 80° F. (27° C.) to give a 0.35 mil film build-up with both cationic resins in the bath being electrodeposited.

The 10 percent solids aqueous electrodeposition bath prepared as described above was modified with about 5 percent by weight (based on resin solids) of 2-ethylhexanol to improve the electrodeposited film appearance. A zinc phosphated steel panel was electrocoated in this bath at a bath temperature of about 80° F. (27° C.) at 125 volts for approximately 90 seconds. The maximum amperage was 0.8 amps which dropped to 0.13 amps during deposition. A relatively thin, clear, colorless, continuous film deposited on both sides of the panel. The coated panel was baked at 400° F. (204° C.) for 20 minutes to produce a dark yellow film which shows good solvent resistance, that is, the film softens but is not removed by rubbing with an acetone-saturated cloth.

EXAMPLE III

The following example shows the preparation of a quaternary ammonium hydroxide-containing polymer from reacting a polyglycidyl ether of a polyphenol with a tertiary amine in the presence of water. The quaternary ammonium hydroxide-containing polymer was then used as an electrocoating vehicle and as a feed resin to control the pH of an electrodeposition bath which contained an acidified cationic resinous coating vehicle.

The quaternary ammonium hydroxide-containing polymer was prepared from the following charge:

| Ingredient | Parts by Weight |
|---|---|
| EPON 1001 | 622.9 |
| PCP 0200 | 176.4 |
| xylene | 49.4 |
| benzyldimethylamine catalyst | 2.2 |
| dimethylcyclohexylamine | 83.4 |
| deionized water | 236.6 |

| Ingredient | Parts by Weight |
|---|---|
| butyl CELLOSOLVE | 236.6 |

The EPON 1001, PCP 0200 and xylene were charged to a reaction vessel and heated under a nitrogen blanket to 195° C. for about 30 minutes. The reaction mixture was cooled to 130° C. and the benzyldimethylamine catalyst added. Reaction was continued for about two hours at about 120°–130° C. The reaction mixture was cooled to about 113° C. followed by the addition of the dimethylcyclohexylamine, deionized water and butyl CELLOSOLVE (all of which were blended together). The reaction mixture was held for two hours at 75°–80° C. to effect quaternization. The reaction mixture was then cooled to room temperature. The quaternary ammonium hydroxide-containing polymer contained 0.748 milliequivalents of total base per gram of resin and 0.655 milliequivalents of quaternary ammonium base group per gram of resin based on resin solids.

The quaternary ammonium hydroxide-containing resin prepared as described above was thinned with 2-ethylhexanol and deionized water in proportions shown below to form a 10 percent solids electrodeposition bath.

| Ingredient | Solids | Parts by Weight |
|---|---|---|
| quaternary ammonium hydroxide-containing resin | 108.0 | 282.6 |
| 2-ethylhexanol | — | 9.5 |
| deionized water | — | 1508.0 |

The quaternary ammonium hydroxide-containing resin was blended with the 2-ethylhexanol and then reduced with the deionized water with stirring. A uniform white dispersion was obtained having a pH of 9.8.

Iron phosphated cold rolled steel panels were electrodeposited in this bath at 300 volts for 90 seconds at a bath temperature of 77° F. (25° C.). The amperage cut off was sharp, dropping from 2.8 to 0.15 amps. A colorless uniform film was obtained. The film was baked at 300° F. (149° C.) for 20 minutes to give a colorless, glossy, sooth, hard film having a thickness of about 1.1 mil.

An acidified cationic resinous coating vehicle which was a quaternary ammonium lactate-containing resin was prepared from the following charge:

| Ingredient | Parts by Weight | Solids |
|---|---|---|
| EPON 829 | 1770 | 1708 |
| Bisphenol A | 302 | 302 |
| propylene glycol (MW = 600) | 850 | 850 |
| dimethylethanolamine | 6.5 | 6.5 |
| lactic acid | 7.5 | 6.6 |
| 2-ethylhexanol | 51.8 | — |
| FOAMKILL 639 | 12.2 | 12.2 |
| isopropanol | 129 | — |
| dimethylethanolamine lactate | 163.9 | 122.7 |
| aqueous boric acid solution | 167 | 7.5 |
| deionized water | 347 | — |
| aqueous boric acid solution | 300 | 13.5 |
| CYMEL 1123[1] | 300 | 300 |
| isopropanol | 248.5 | — |

[1]Benzoguanamine-formaldehyde condensate commercially available from American Cyanamid Company.

The EPON 829 and Bisphenol A were charged to a reaction vessel and heated to exotherm at 160° C. The exotherm was maintained for about 30 minutes followed by cooling to 100° C. and the addition of the polypropylene glycol and dimethylethanolamine. The reaction mixture was then heated to 130° C. and held at this temperature for about 5½ hours, after which the 2-ethylhexanol, FOAMKILL 639, first portion of isopropanol, the dimethylethanolamine lactate, the first portion of boric acid and the deionized water were added. The reaction mixture was held at about 85° C. for about one hour followed by the addition of the second portion of boric acid. The benzoguanamine (curing agent) was then added followed by cooling of the reaction mixture to room temperature and thinning with the second portion of isopropanol.

The quaternary ammonium lactate-containing resin prepared as described above was thinned with deionized water to form an electrodeposition bath in the following charge ratio:

| Ingredient | Parts by Weight | Solids |
|---|---|---|
| quaternary ammonium lactate-containing resin | 415.4 | 270.0 |
| water | 1384.6 | — |

The resin was reduced with the deionized water while stirring to give a white uniform dispersion having a pH of 6.0.

The above electrodeposition bath was acidified to a pH of 4.7 by adding 88 percent aqueous lactic acid to simulate build-up of acid which occurs in an electrodeposition bath after it has been in use for sometime.

One thousand parts by weight of the electrodeposition bath were removed and replaced with 1000 parts by weight of the quaternary ammonium hydroxide-containing electrodeposition bath prepared as described above in this example. The new bath had a pH of 6.2. An iron phosphated cold rolled steel panel was electrodeposited in this bath at 200 volts for 90 seconds, bath temperature 80° F. (27° C.). A colorless, continuous film was obtained. The film was baked at 400° F. (204° C.) for 20 minutes to give a colorless, smooth, glossy film having a thickness of about 0.9 mil.

EXAMPLE IV

The quaternary ammonium hydroxide-containing polymer of Example III (250 parts by weight) was thinned with 303.7 parts by weight of deionized water to form a dip coating bath. A zinc phosphated steel panel was dipped into the bath, removed, drained vertically for 2 minutes and then baked at 350° F. (177° C.) for 20 minutes to give a hard, glossy, light yellow film. When the example was repeated with the exception that the coating was baked at 400° F. (204° C.) for 20 minutes, a hard, glossy, yellow film having a thickness of 0.6 to 0.8 mil was obtained.

EXAMPLE V

The following example shows chain extension of a polyglycidyl ether of a cyclic polyol with an N-heterocyclic material and quaternization of this adduct with dimethylethanolamine and water to form the quaternary ammonium hydroxide.

The quaternary ammonium hydroxide-containing polymer was prepared from the following charge:

| Ingredient | Parts by Weight |
| --- | --- |
| EPON 829 | 395.9 |
| N-heterocyclic material[1] | 400.0 |
| xylene | 50.0 |
| TEXANOL | 137 |
| dimethylethanolamine | 61.8 |
| deionized water | 93.5 |
| methyl ethyl ketone | 157 |

[1]N-heterocyclic material was the adduct of one mole of EPON 829 and two moles of 5,5-dimethyl hydantoin.

The EPON 829, N-heterocyclic material and xylene were charged to a reaction vessel under a nitrogen atmosphere and heated to 175° C. over the period of about one hour and 10 minutes. The reaction temperature was maintained at 175° C. for about 2 hours, cooled to 150° C., the TEXANOL added, followed by further cooling to 85° C. and the addition of the dimethylethanolamine and deionized water for the purpose of quaternizing the reaction product. The reaction mixture was digested for about 20 minutes at about 80°-90° C. to give a readily dispersible reaction product of somewhat high viscosity. The reaction mixture was then thinned with methyl ethyl ketone. The reaction mixture had a solids content of 73.9 percent, contained 0.602 milliequivalents of total base per gram sample and 0.476 milliequivalents of quaternary ammonium base groups per gram sample. A small portion of the reaction mixture thinned with deionized water to form a 10 percent solids dispersion had a pH of 10.2.

The resinous reaction product was thinned with deionized water to form a 20 percent resin solids dispersion. A zinc phosphated steel panel was dip coated in the dispersion, removed therefrom, permitted to hang vertically for 2 minutes and then baked for 15 minutes at 350° F. (177° C.) to give a hard, tack-free film. Twelve double rubs with an acetone-saturated cloth removed the film. The dispersion was further thinned with deionized water to form a 15 percent resin solids dispersion. A zinc phosphated steel panel was cathodically electrodeposited in the bath at a temperature of 77° F. (25° C.) at 200 volts for 45 seconds to give a self-insulating film. The film was rinsed with deionized water to remove dragout and baked for 20 minutes at 350° F. (177° C.) to give a hard, somewhat rough coating. Thirty double rubs with an acetone-saturated cloth removed the film.

A zinc phosphated steel panel was cathodically electrodeposited in the bath as described above except that the time of electrodeposition was 60 seconds. When the film was baked at 400° F. (204° C.) for 20 minutes, a somewhat smoother film was obtained. Forty double rubs with an acetone-saturated cloth removed the film.

We claim:

1. A water-dispersible, curable, resinous coating composition in which the resinous commponent comprises an active hydrogen-containing quaternary ammonium hydroxide-containing polymer in combination with a blocked isocyanate curing agent, said quaternary ammonium hydroxide-containing polymer comprising the reaction product of:

(A) a polyglycidyl ether of a cyclic polyol;

(B) a tertiary amine;

sufficient water being present during the reaction of (A) and (B) for the formation of quaternary ammonium hydroxide groups without substantial advancement in molecular weight of the polymer, said quaternary ammonium hydroxide-containing polymer having a molecular weight of 1000 to 5000 and containing 0.05 to 6.0 milliequivalents of quaternary nitrogen base group per gram of polymer.

2. The polymer of claim 1 in which the cyclic polyol is selected from the class consisting of polyphenols and alicyclic polyols.

3. The polymer of claim 2 in which the cyclic polyol is an oxyalkylated derivative of the polyphenol and the alicyclic polyol.

4. The polymer of claim 1 in which the polyglycidyl ether of a cyclic polyol is a chain extended product with a polymeric polyol.

5. The polymer of claim 4 in which the polymeric polyol is a polyester polyol.

6. The polymer of claim 5 in which the polyester polyol is a polylactone polyol.

7. The polymer of claim 1 in which the polyglycidyl ether of a cyclic polyol is a chain extended product with an N-heterocyclic ring-containing material having one or more

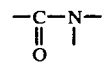

moieties in the ring.

8. The polymer of claim 1 in which the N-heterocyclic ring-containing material has the following structural formula:

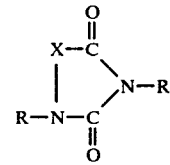

where X is a bivalent radical which is necessary to complete a 5 or 6-membered unsubstituted or substituted heterocyclic ring; where R is H or

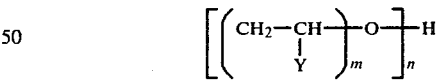

where Y is hydrogen or lower alkyl having 1 to 4 carbon atoms, m is 1 to 4, and n is 1 to 50.

9. A coated article comprising a solid substrate having deposited thereon a cured resinous coating composition, said resinous composition being deposited on said substrate from an aqueous resinous dispersion in which the resinous phase comprises the resinous coating composition of any of claims 1,2, 3, 4, 5, 6, 7 or 8.

* * * * *